Nov. 18, 1930.  S. E. DUNHAM  1,782,258
PACKING FOR PISTON RODS AND VALVE STEMS
Filed Nov. 24, 1928  2 Sheets-Sheet 1
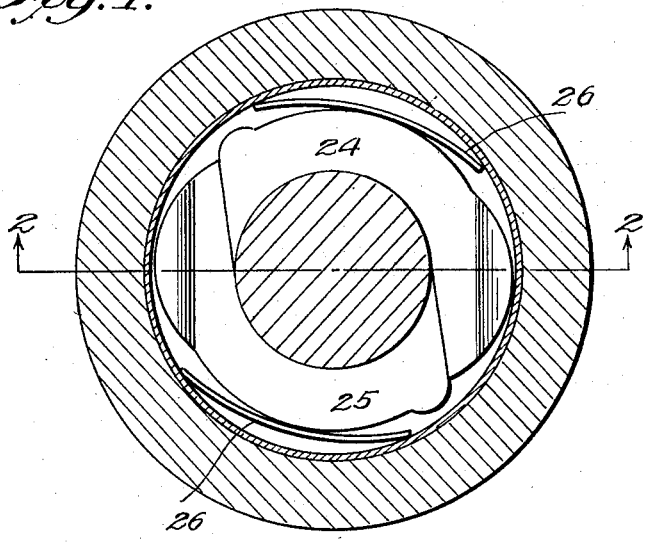
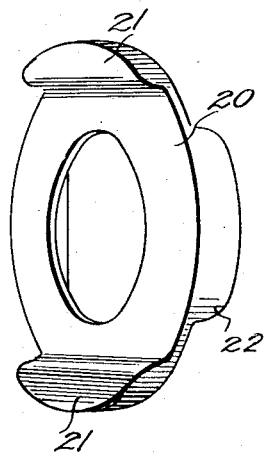
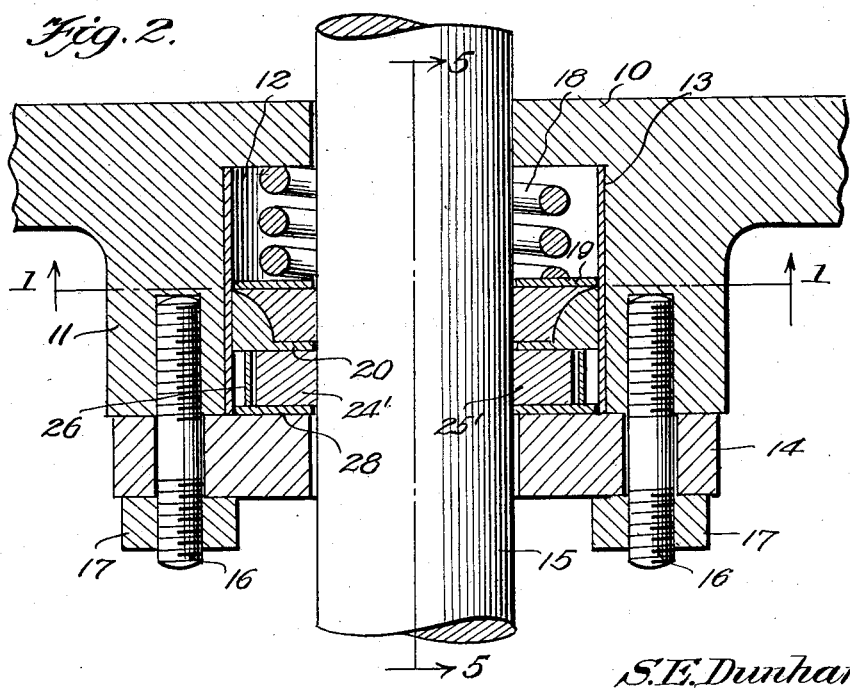
S. E. Dunham
INVENTOR
BY Victor J. Evans
ATTORNEY Nov. 18, 1930.   S. E. DUNHAM   1,782,258
PACKING FOR PISTON RODS AND VALVE STEMS
Filed Nov. 24, 1928   2 Sheets-Sheet 2
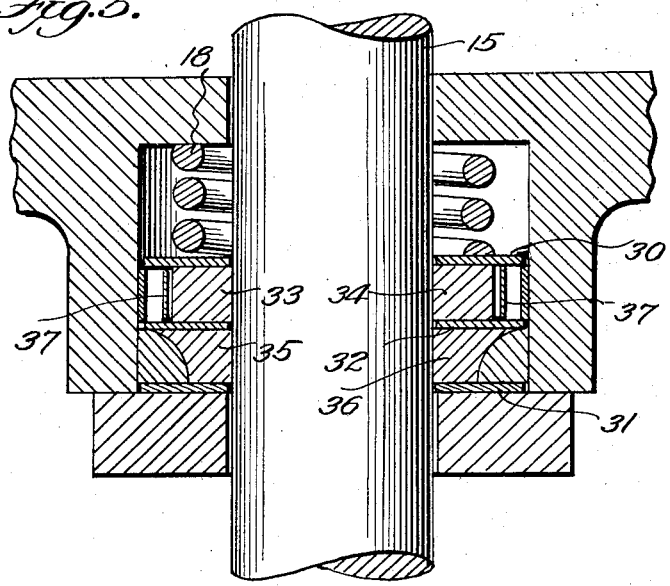
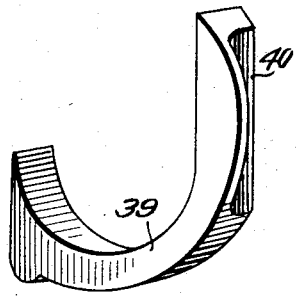
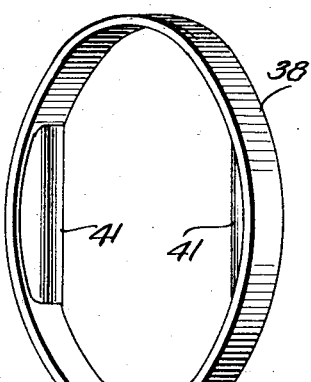
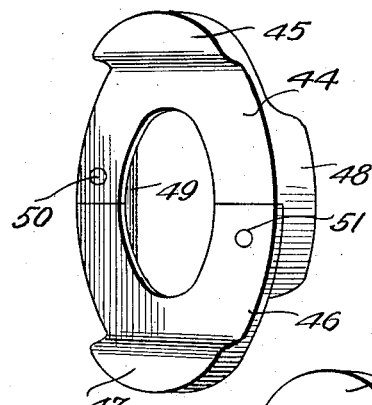
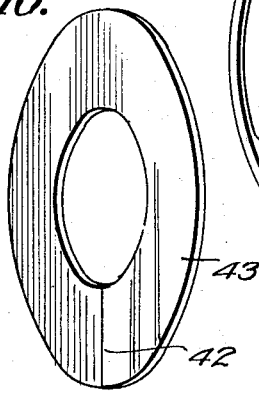
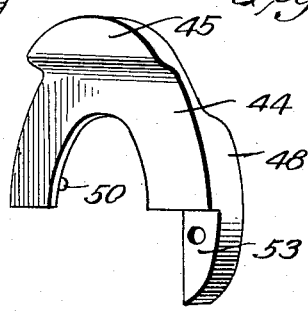
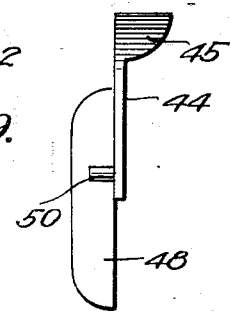
S. E. Dunham
INVENTOR
BY Victor J. Evans
ATTORNEY Patented Nov. 18, 1930

1,782,258

UNITED STATES PATENT OFFICE

SAMUEL E. DUNHAM, OF AUGUSTA, GEORGIA

PACKING FOR PISTON RODS AND VALVE STEMS

Application filed November 24, 1928. Serial No. 321,723.

The object of this invention is to provide self seating metallic packing elements, for use in the stuffing box of a piston rod, or under any similar conditions, the elements being assembled in the special manner hereinafter disclosed.

A further object is to provide, in one form, an annular element, having beveled lugs, or transverse extensions on opposite sides adapted to retain in position a plurality of spring held and approximately segmental packing elements which will have close contact with the piston rod, but permit sufficient freedom of movement thereof.

With the foregoing and other objects in view, the invention consists in the novel construction and arrangement of elements described, illustrated and claimed, it being understood that modifications may be made within the scope of the claim without departing from the spirit of the invention.

In the drawings forming part of this application:—

Figure 1 is a transverse section thru the stuffing box of a piston rod, the section being on line 1—1 of Figure 2.

Figure 2 is a section diametrically thru the stuffing box, and on the line 2—2 of Figure 1.

Figure 3 is a perspective view of an element on opposite sides of which the packing devices per se are to be positioned, being located between the lugs or extensions shown in this view.

Figure 4 is a perspective view of one of the elements of a packing ring.

Figure 5 is a vertical section thru a stuffing box, showing a slightly modified arrangement of the packing elements.

Figure 6 is a perspective view of a guiding or enclosing ring within which the packing elements are to be positioned.

Figure 7 is a perspective view of an element serving the purpose of that shown in Figure 3, but being formed of a plurality of sections having a particular type of connection.

Figure 8 is a perspective view of one of the elements of Figure 7.

Figure 9 is a detail in elevation looking from the left in Figure 8.

A cylinder head or the like designated 10 is formed with walls 11 enclosing the stuffing box 12, the latter having therein a lining or sleeve 13, and the stuffing box being closed by plate 14 having a central opening for the accommodation of the piston rod 15. Stud bolts 16 are secured by nuts 17, in a more or less conventional manner.

Within the stuffing box is the coiled spring 18 surrounding the piston rod 15 and tending to hold the elements of the packing in the position desired, that is imparting thrust in a downward direction in Figure 2.

Spring 18 contacts with a plate or ring member 19, and below the latter is a particular form of spacing and ring retaining element, such as that shown in Figure 3, wherein the plate portion is designated 20, and lugs or extensions 21 are positioned on one side of the plate, in opposite relation, and other similar devices 22 are positioned on the opposite side, and the central portions of these devices 21 and 22 are at an angle of approximately 90 degrees, providing the spacing indicated in Figure 3.

The several plates of Figure 2 may be termed disks, and the lugs of disk 20 are preferably bevelled.

By the use of this device 20, including the lugs or extensions 21 and 22, the whole being placed within the sleeve or lining 13 of Figure 2, I am enabled to satisfactorily position upper and lower packing rings, each including a plurality of elements such as 24 and 25 of Figure 1, the lower elements of Figure 2 being however designated 24′ and 25′. The said metal packing elements are so proportioned that they will have edges tending to wedge the rings slightly with reference to each other, causing them to grip a piston rod, to a reasonable extent, but permitting the required reciprocating movement of the latter. The rings are mounted between the elements 21 on one side of the plate 20 and the elements 22 on the other side thereof—and in each instance are held by springs such as 26, urging the ring elements toward the center of the stuffing box and therefore into contact with the piston rod. A lower annular plate 28 is shown in Figure 2 and serves an obvious purpose in connection with the mounting of the lower pair of packing ring elements.

In the modification shown in Figure 5, the piston rod is designated 15 as before, and the latter is surrounded by a spring 18 bearing on an upper plate 30. The packing elements are positioned between plate 30 and the lower plate 31, and the pairs of packing elements are separated by plate 32. The elements of the individual rings are designated 33 and 34, 35 and 36, and springs bearing on the upper pair of elements are designated 37.

Figure 6 shows a ring 38 adapted to receive a pair of segmental elements of the form shown for instance in Figure 4, wherein each element 39 is provided with a cut away portion forming a shoulder at 40, the shouldered portion, in each instance, engaging an inwardly extending lug 41, a pair of these lugs being oppositely located within the ring 38. Wherever required the separating plates may be split as indicated at 42 in Figure 10, this plate being designated 43.

Lugs 41, and lugs such as 45, form elongated lips remote from the center, and provide a chord-like reinforcement of the edge portions of the element or elements carrying these lugs.

In Figure 7 is will be observed that the plate member carrying the lugs is formed in a plurality of sections, this device corresponding in function with that shown in Figure 3. The section 44 includes a lug 45, and section 46 includes a lug 47—element 45 further including a lug or extension 48, and the extension 49 is oppositely located as indicated in Figure 7. Pins 50 and 51 pass thru the sections and are adapted to engage shouldered portions such as the shoulder 53 of Figure 8, it being understood that the pins project from end portions of the sections located approximately diametrically opposite each other. The separating and guiding member formed in this manner is capable of use under special conditions where the device shown in Figure 3 is not so readily handled, and the elements of the packing rings will cooperate with the structure of Figure 7 in the same manner as with that of Figure 3.

Having described the invention what is claimed is:—

In a device of the class described, a packing ring comprising a plurality of segmental sections each having a flat edge portion, resilient means bearing on the outer edges of the sections, a disk adjacent to which the sections are mounted, said disk and sections being adapted to surround a rod, and lugs carried by the disk and positioned at points opposite each other, for engaging the edge portions of the sections, said lugs forming elongated lips remote from the center and constituting chord reinforcements of the edge portions of the disk.

S. E. DUNHAM.